(12) United States Patent
Speller et al.

(10) Patent No.: US 11,852,232 B1
(45) Date of Patent: Dec. 26, 2023

(54) PERSISTENT LUBRICATION SYSTEMS FOR AIRCRAFT GEARBOXES

(71) Applicant: Textron Innovations Inc., Providence, RI (US)

(72) Inventors: Charles Hubert Speller, Flower Mound, TX (US); Ezra Mike Tiprigan, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/978,919

(22) Filed: Nov. 1, 2022

(51) Int. Cl.
*F16H 57/04* (2010.01)
*B64C 29/00* (2006.01)

(52) U.S. Cl.
CPC ..... *F16H 57/0442* (2013.01); *B64C 29/0033* (2013.01); *F16H 57/0436* (2013.01); *F16H 57/0445* (2013.01); *F16H 57/0453* (2013.01); *F16H 57/0404* (2013.01); *F16H 57/0417* (2013.01)

(58) Field of Classification Search
CPC ............. F16H 57/0435; F16H 57/0436; F16H 57/0441; F16H 57/0442; F16H 57/0445; F16H 57/0453
See application file for complete search history.

(56) References Cited

U.S. PATENT DOCUMENTS

| | | | | |
|---|---|---|---|---|
| 5,121,815 A | * | 6/1992 | Francois | ................. B64C 27/12 184/6.12 |
| 6,644,439 B2 | * | 11/2003 | Schnitzer | ............ F16H 57/0456 184/6.12 |
| 7,516,729 B2 | * | 4/2009 | Bedford | ............... F01M 11/064 123/196 R |
| 10,443,706 B2 | | 10/2019 | Ehinger | |
| 10,816,085 B2 | | 10/2020 | Olson et al. | |
| 11,313,455 B2 | | 4/2022 | Mueller | |
| 11,391,363 B2 | * | 7/2022 | Sbabo | ................. F16H 57/0445 |
| 2011/0272239 A1 | * | 11/2011 | Yoshikawa | ......... F16H 61/0021 192/113.3 |
| 2018/0363762 A1 | * | 12/2018 | Kiyokami | ........... F16H 57/0441 |
| 2022/0107018 A1 | * | 4/2022 | Zamponi | ................... F16N 7/32 |

FOREIGN PATENT DOCUMENTS

| | | | | |
|---|---|---|---|---|
| EP | 3312477 A1 | * | 4/2018 | ............... F01M 1/02 |
| EP | 4124780 A1 | * | 2/2023 | ......... F16H 57/0435 |

* cited by examiner

*Primary Examiner* — Minh Truong
(74) *Attorney, Agent, or Firm* — Lawrence Youst PLLC (57) ABSTRACT

A drive system for an aircraft such as a tiltrotor aircraft. The drive system includes first and second gearbox assemblies in mechanical communication with each other. A first lubrication system is associated with the first gearbox assembly and includes a bifurcated tank configured to contain a lubricant in an operating chamber including a lower sump and in an emergency chamber including an upper sump. A second lubrication system is associated with the second gearbox assembly. An emergency pump is in fluid communication with the emergency chamber. The emergency pump is configured to supply the lubricant to the first gearbox assembly from the emergency chamber responsive to a failure in the first lubrication system. In addition, the emergency pump is configured to supply the lubricant to the second gearbox assembly and to the operating chamber from the emergency chamber responsive to a failure in the second lubrication system.

20 Claims, 9 Drawing Sheets

PERSISTENT LUBRICATION SYSTEMS FOR AIRCRAFT GEARBOXES

GOVERNMENT RIGHTS

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD OF THE DISCLOSURE

The present disclosure relates, in general, to lubrication systems for aircraft gearbox assemblies and, in particular, to lubrication systems having persistent lubrication for multiple aircraft gearbox assemblies following a failure or loss of lubrication in any one of the aircraft gearbox assemblies.

BACKGROUND

Aircraft include many components and systems that are powered by one or more engines. For example, engines in a rotorcraft such as a helicopter or tiltrotor aircraft provide power to one or more propulsion systems, such as rotor systems or proprotor systems, through one or more drive systems. The drive systems may include components such as gearboxes, masts, driveshafts, bearings and gears which transfer torque and rotational energy from the engine to the propulsion system. Typically, gearboxes that are located between an engine and a propulsion system of a rotorcraft require lubrication that is provided by a lubrication system, the proper functioning of which is critical to the safety and service life of the aircraft.

When functioning properly, an aircraft gearbox lubrication system reduces the likelihood that the drive system will lose torque, fail or overheat. In one example, a pressurized aircraft gearbox lubrication system may operate properly when the pressure is maintained above a threshold pressure but may not operate properly when the pressure drops below the threshold pressure. In some aircraft gearboxes, a failure at any point in the lubrication system such as a gear, a shaft, a pump, a pressurized tube or a sump can cause complete failure of the lubrication system resulting in the entire gearbox losing lubrication. If the design of gears in the gearbox relies on the lubrication system to maintain proper operating temperature, then such a loss of lubrication could result in a catastrophic failure of the gears in the gearbox and could hinder the ability of an aircraft to remain in flight. Accordingly, some aviation regulations require that a pressurized lubrication system of an aircraft remain operable for a specified amount of time after the occurrence of such a loss of lubrication event.

SUMMARY

In a first aspect, the present disclosure is directed to a drive system for an aircraft. The drive system includes a first gearbox assembly and a second gearbox assembly that is in mechanical communication with the first gearbox assembly. A first lubrication system is associated with the first gearbox assembly and includes a bifurcated tank configured to contain a lubricant in an operating chamber including a lower sump and in an emergency chamber including an upper sump. A second lubrication system is associated with the second gearbox assembly. An emergency pump is in fluid communication with the emergency chamber. The emergency pump is configured to supply the lubricant to the first gearbox assembly from the emergency chamber responsive to a failure in the first lubrication system. The emergency pump is also configured to supply the lubricant to the second gearbox assembly and to the operating chamber from the emergency chamber responsive to a failure in the second lubrication system.

In certain embodiments, the bifurcated tank may include a dam between the emergency chamber and the operating chamber. In some embodiments, during normal operating conditions of the first and second lubrication systems, the operating chamber may be configured to receive the lubricant from the emergency chamber that spills over the dam. In certain embodiments, responsive to the failure in the second lubrication system, the emergency chamber may be configured to receive the lubricant from the operating chamber that spills over the dam. In some embodiments, the emergency chamber may be above a first portion of the operating chamber and beside a second portion of the operating chamber. In certain embodiments, the bifurcated tank may include an inlet that is disposed above the emergency chamber such that the lubricant entering the bifurcated tank from the inlet flows into the emergency chamber. In some embodiments, the bifurcated tank may include an operating outlet disposed below the lower sump such that the lubricant from the operating chamber exits the bifurcated tank through the operating outlet during normal operating conditions of the first lubrication system.

In certain embodiments, the emergency pump may be configured to supply the lubricant to the first gearbox assembly from the emergency chamber responsive to the failure in the first lubrication system for a predetermined period of time. In some embodiments, the emergency pump may be configured to supply the lubricant to the second gearbox assembly from the emergency chamber responsive to the failure in the second lubrication system for a predetermined period of time. In certain embodiments, the emergency pump may be an electrically operated pump. In some embodiments, the emergency pump may include a valve, a suction port, a first discharge port and a second discharge port. In such embodiments, the valve may be shiftable between first and second positions wherein, in the first position, the suction port is in fluid communication with the first discharge port and out of fluid communication with the second discharge port such that the emergency pump is configured to supply the lubricant to the first gearbox assembly from the emergency chamber responsive to the failure in the first lubrication system and wherein, in the second position, the suction port is in fluid communication with the second discharge port and out of fluid communication with the first discharge port such that the emergency pump is configured to supply the lubricant to the second gearbox assembly and to the operating chamber from the emergency chamber responsive to the failure in the second lubrication system. In certain embodiments, the valve may be a solenoid valve.

In some embodiments, responsive to the failure in the second lubrication system, the emergency pump may supply the lubricant to the second gearbox assembly at a first flow rate and to the operating chamber at a second flow rate that is greater than the first flow rate. In certain embodiments, the first and second lubrication systems may be pressurized lubrication systems. In some embodiments, the first lubrication system may include an operating pump, a heat exchanger, a filter and at least one lubrication line. In certain embodiments, the second lubrication system may include a tank, an operating pump, a heat exchanger, a filter and at least one lubrication line.

In a second aspect, the present disclosure is directed to a tiltrotor aircraft having a helicopter mode and an airplane mode. The tiltrotor aircraft includes a proprotor assembly and a first gearbox assembly that is in mechanical communication with the proprotor assembly. A second gearbox assembly is in mechanical communication with the first gearbox assembly. An engine is in mechanical communication with the second gearbox assembly and is configured to provide torque and rotational energy to the proprotor assembly via the first and second gearbox assemblies. A first lubrication system is associated with the first gearbox assembly and includes a bifurcated tank configured to contain a lubricant in an operating chamber including a lower sump and in an emergency chamber including an upper sump. A second lubrication system is associated with the second gearbox assembly. An emergency pump is in fluid communication with the emergency chamber. The emergency pump is configured to supply the lubricant to the first gearbox assembly from the emergency chamber responsive to a failure in the first lubrication system. The emergency pump is also configured to supply the lubricant to the second gearbox assembly and to the operating chamber from the emergency chamber responsive to a failure in the second lubrication system.

In certain embodiments, the first gearbox assembly may include a proprotor gearbox. In some embodiments, the second gearbox assembly may include an interconnect gearbox.

In a third aspect, the present disclosure is directed to an aircraft including a rotor assembly and a first gearbox assembly that is in mechanical communication with the rotor assembly. A second gearbox assembly is in mechanical communication with the first gearbox assembly. An engine is in mechanical communication with the second gearbox assembly and is configured to provide torque and rotational energy to the rotor assembly via the first and second gearbox assemblies. A first lubrication system is associated with the first gearbox assembly and includes a bifurcated tank configured to contain a lubricant in an operating chamber including a lower sump and in an emergency chamber including an upper sump. A second lubrication system is associated with the second gearbox assembly. An emergency pump is in fluid communication with the emergency chamber. The emergency pump is configured to supply the lubricant to the first gearbox assembly from the emergency chamber responsive to a failure in the first lubrication system. The emergency pump is also configured to supply the lubricant to the second gearbox assembly and to the operating chamber from the emergency chamber responsive to a failure in the second lubrication system.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
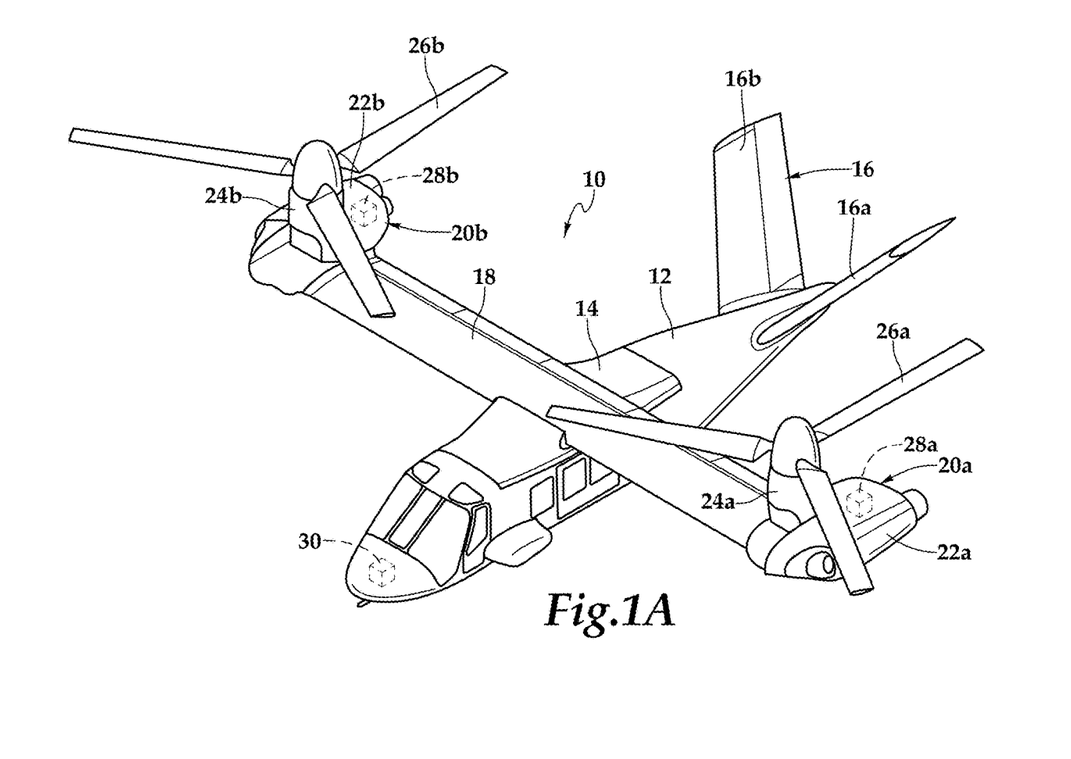
FIGS. 1A-1B are schematic illustrations of a tiltrotor aircraft including persistent lubrication systems in accordance with embodiments of the present disclosure.
Figure 1B:
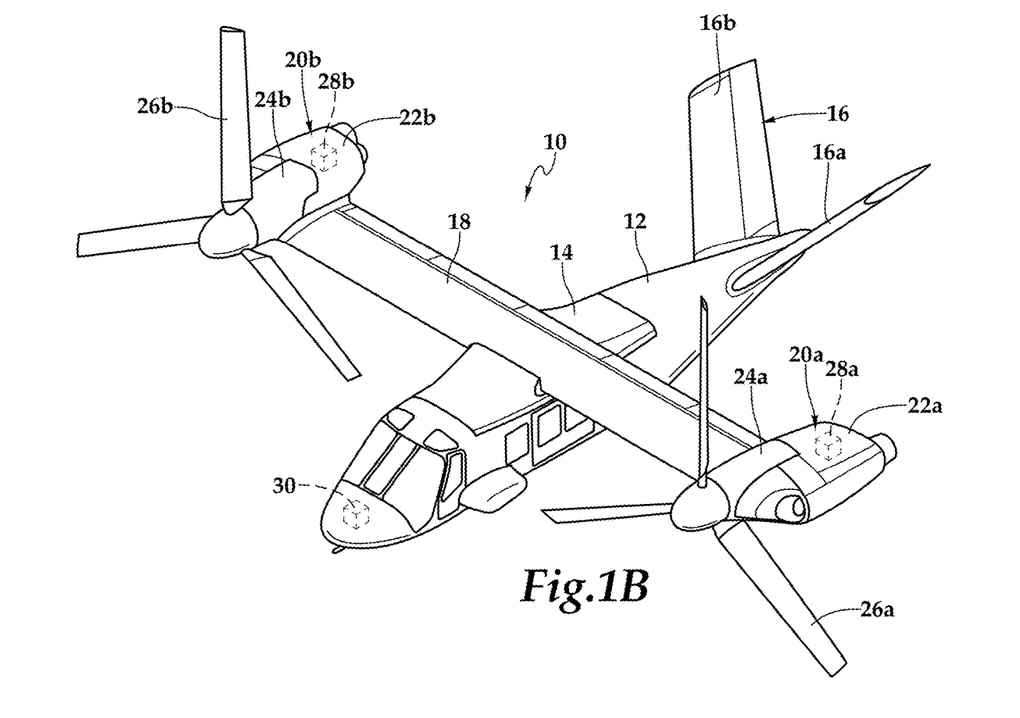

Referring to FIGS. 1A-1B in the drawings, an aircraft depicted as a rotorcraft and more particularly as a tiltrotor aircraft is schematically illustrated and generally designated 10. Aircraft 10 includes a fuselage 12, a wing mount assembly 14 that is rotatable relative to fuselage 12 and a tail assembly 16 including rotatably mounted tail members 16a, 16b having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 to convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are propulsion assemblies 20a, 20b. Propulsion assembly 20a includes a fixed nacelle 22a that houses an engine and a fixed portion of the drive system. In addition, propulsion assembly 20a includes a pylon assembly 24a that is positioned inboard of fixed nacelle 22a and above wing 18. Pylon assembly 24a is rotatable relative to fixed nacelle 22a and wing 18 between a generally vertical orientation, as best seen in FIG. 1A, a generally horizontal orientation, as best seen in FIG. 1B. Pylon assembly 24a includes a rotatable portion of the drive system and a rotor assembly depicted as proprotor assembly 26a that is rotatable responsive to torque and rotational energy provided via the engine and drive system. Propulsion assembly 20a includes a lubrication system 28a that provides persistent lubrication for multiple gearbox assemblies within the drive system of propulsion assembly 20a. Likewise, propulsion assembly 20b includes a fixed nacelle 22b that houses an engine and a fixed portion of the drive system. In addition, propulsion assembly 20b includes a pylon assembly 24b that is positioned inboard of fixed nacelle 22b and above wing 18. Pylon assembly 24b is rotatable relative to fixed nacelle 22b and wing 18 between a generally vertical orientation, as best seen in FIG. 1A, a generally horizontal orientation, as best seen in FIG. 1B. Pylon assembly 24b includes a rotatable portion of the drive system and a rotor assembly depicted as proprotor assembly 26b that is rotatable responsive to torque and rotational energy provided via the engine and drive system. Propulsion assembly 20b includes a lubrication system 28b that provides persistent lubrication for multiple gearbox assemblies within the drive system of propulsion assembly 20b.

FIG. 1A illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. FIG. 1B illustrates aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. It should be appreciated that aircraft 10 can be operated such that proprotor assemblies 26a, 26b are selectively positioned between airplane mode and helicopter mode, which can be referred to as a conversion flight mode. Even though aircraft 10 has been described as having one engine in each fixed nacelle 22a, 22b, it should be understood by those having ordinary skill in the art that other propulsion system arrangements are possible and are considered to be within the scope of the present disclosure including, for example, having one or more engines housed within the fuselage that provide torque and rotational energy to both proprotor assemblies 26a, 26b.

During all flight modes, proprotor assemblies 26a, 26b rotate in opposite directions to provide torque balancing to aircraft 10. For example, when viewed from the front of aircraft 10 in forward flight mode, proprotor assembly 26a rotates clockwise and proprotor assembly 26b rotates counterclockwise. In the illustrated embodiment, proprotor assemblies 26a, 26b each include three twisted proprotor blades that are equally spaced apart circumferentially at approximately 120 degree intervals. It should be understood by those having ordinary skill in the art, however, that the proprotor assemblies of the present disclosure could have proprotor blades with other designs and other configurations including proprotor assemblies having four, five or more proprotor blades. Further, it should be understood by those having ordinary skill in the art that aircraft 10 is merely illustrative of a variety of aircraft that can be used to implement embodiments of the present disclosure. Other aircraft implementations can include, for example, fixed wing airplanes, hybrid aircraft, unmanned aircraft, gyrocopters, helicopters and drones to name a few. Moreover, it should be appreciated that even though aircraft are particularly well suited to implement embodiments of the present disclosure, the described embodiments can also be implemented using non-aircraft vehicles and devices.

Aircraft 10 has a fly-by-wire control system that includes a flight control computer 30 that is preferably a redundant digital flight control system including multiple independent flight control computers. Flight control computer 30 preferably includes non-transitory computer readable storage media including a set of computer instructions executable by one or more processors for controlling the operation of aircraft 10. Flight control computer 30 may be implemented on one or more general-purpose computers, special purpose computers or other machines with memory and processing capability. Flight control computer 30 may include one or more memory storage modules including random access memory, non-volatile memory, removable memory or other suitable memory. Flight control computer 30 may be a microprocessor-based system operable to execute program code in the form of machine-executable instructions. Flight control computer 30 may be connected to other computer systems via a suitable communications network that may include both wired and wireless connections.

Flight control computer 30 communicates via a wired communications network within airframe 12 with the electronic systems and subsystems of aircraft 10 including sensors, controllers, actuators, pumps, valves, regulators, switches, user interfaces and other electronic systems used during flight and non-flight operations. Flight control computer 30 may autonomously control some or all aspects of flight operation for aircraft 10. Flight control computer 30 is also operable to communicate with remote systems, such as a ground station via a wireless communications protocol. The remote system may be operable to receive flight data from and provide commands to flight control computer 30 to enable remote flight control over some or all aspects of flight operation for aircraft 10. In addition, aircraft 10 may be pilot operated such that a pilot interacts with a pilot interface that receives flight data from and provides commands to flight control computer 30 to enable onboard pilot control over some or all aspects of flight operation for aircraft 10.

Figure 2A:
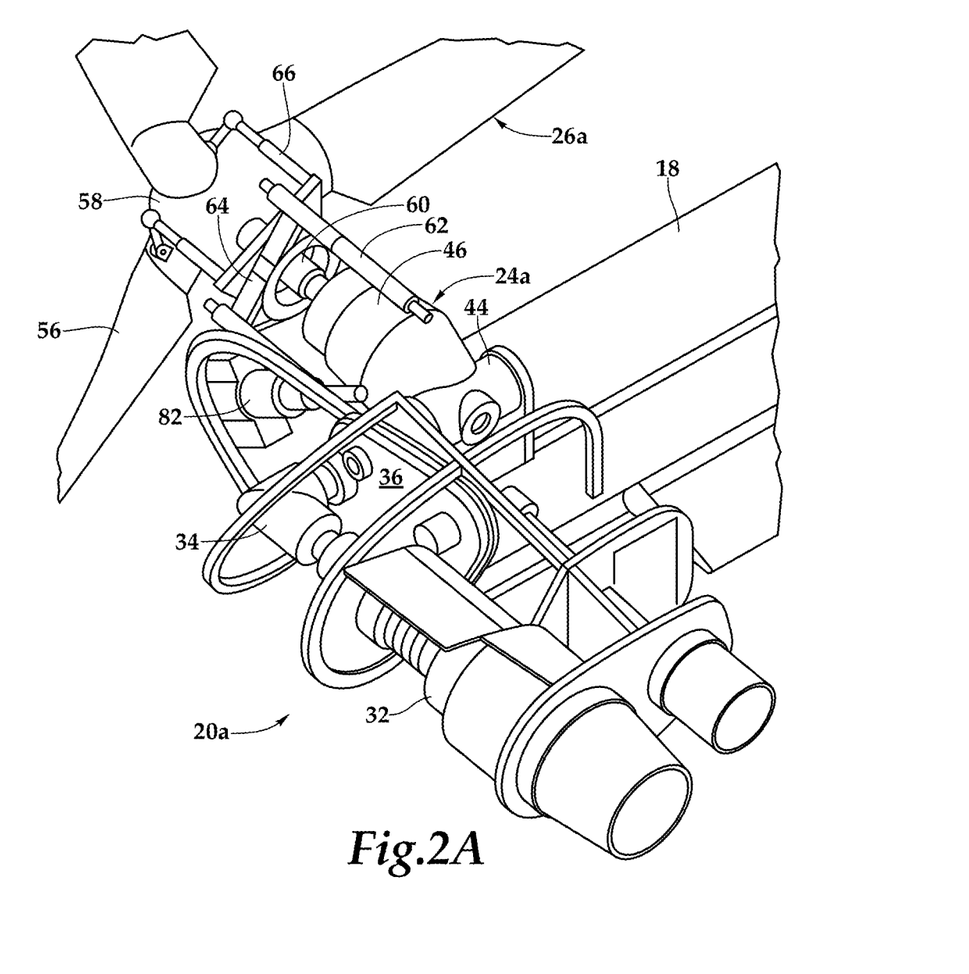
FIGS. 2A-2B are perspective views of a propulsion system and components parts thereof for a tiltrotor aircraft including persistent lubrication systems in accordance with embodiments of the present disclosure.
Figure 2B:
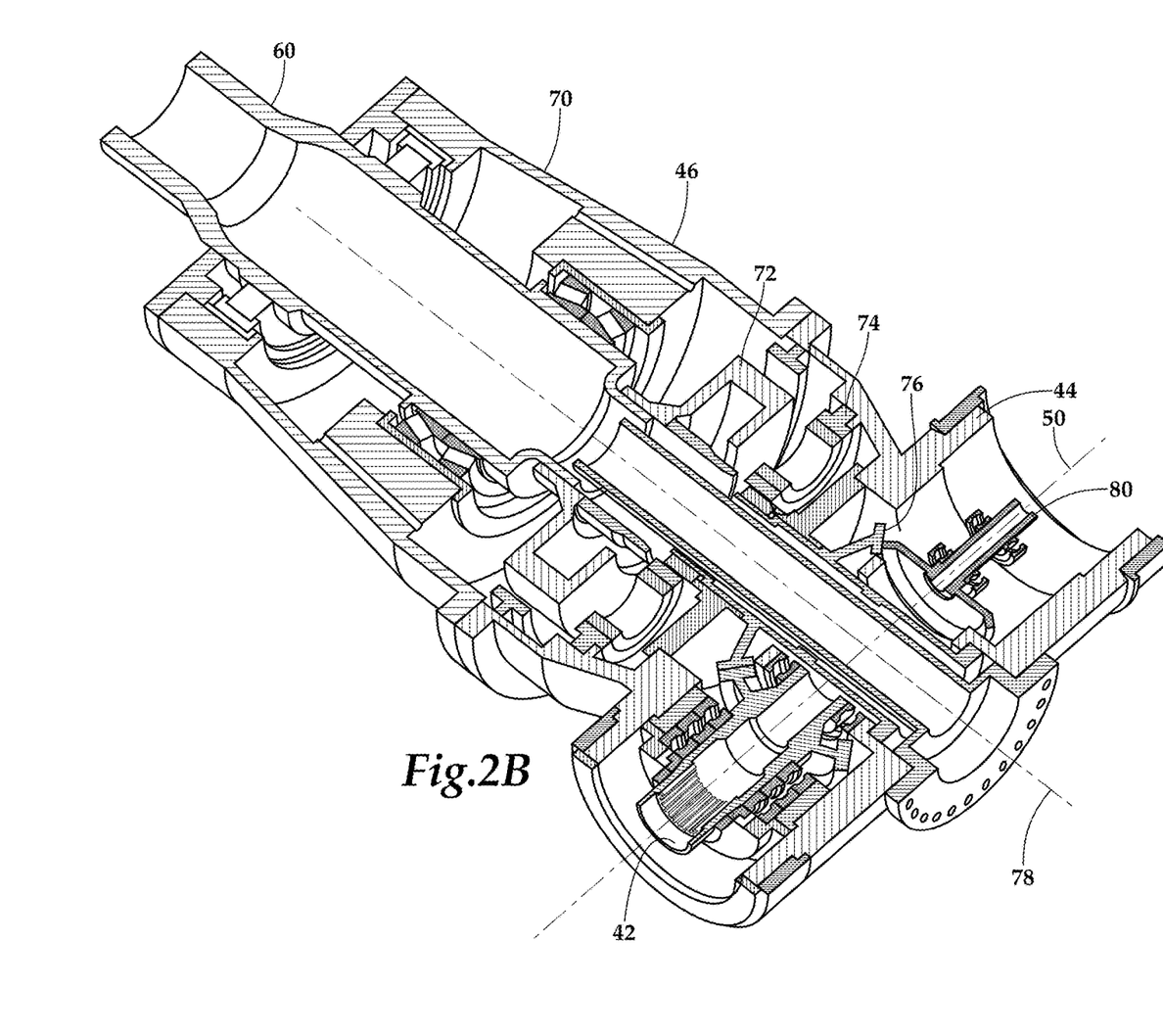

Referring to FIGS. 2A-2B in the drawings, additional details of propulsion assembly 20a will now be disclosed. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Propulsion system 20a includes an engine 32 that is fixed relative to wing 18. An engine output shaft transfers power from engine 32 to a spiral bevel gearbox 34 that includes spiral bevel gears to change torque direction by 90 degrees from engine 32 to an interconnect gearbox 36. Interconnect gearbox 36 includes a plurality of gears, such as helical gears, in a gear train that are coupled to an interconnect drive shaft 38 (see FIG. 3) and an output shaft (not visible). Interconnect drive shaft 38 provides a torque path that enables a single engine to provide torque to both proprotors assemblies 26a, 26b in the event of a failure of the other engine. Torque is transferred to an input gear 42 in spindle gearbox 44 through the output shaft of interconnect gearbox 36.

As best seen in FIG. 2A, proprotor assembly 26a of propulsion system 20a includes a plurality of proprotor blades 56 coupled to a yoke 58 that is coupled to a mast 60. Mast 60 is coupled to proprotor gearbox 46. The collective and/or cyclic pitch of proprotor blades 56 may be controlled responsive to pilot input via actuators 62, swashplate 64 and pitch links 66. As best seen in FIG. 2B, proprotor gearbox 46 is configured to transfer power and reduce engine rotational speed to mast 60. Proprotor gearbox 46 includes a top case portion 70. Speed reduction is accomplished by a low speed planetary gear assembly 72 and a high speed planetary gear assembly 74. Spindle gearbox 44 includes a spiral bevel gear assembly having a spiral bevel input gear 42 and a spiral bevel output gear 76. The spiral bevel gear assembly changes power direction from along longitudinal axis 50 of spiral bevel input gear 42 to a centerline axis 78 of spiral bevel output gear 76. An accessory drive 80 can be coupled to spiral bevel output gear 76. It should be appreciated that a gearbox assembly such as spindle gearbox 44 and proprotor gearbox 46 can include additional or different components including bearing systems, lubrication systems and other gearbox related systems that may be beneficial for operation. During operation, a conversion actuator 82 can be actuated so as to selectively rotate proprotor gearbox 46 and thus pylon assembly 24a about conversion axis 50, which in turn selectively positions proprotor assembly 26a between helicopter mode, as best seen in FIG. 1A, and airplane mode, as best seen in FIG. 1B.

Figure 3:
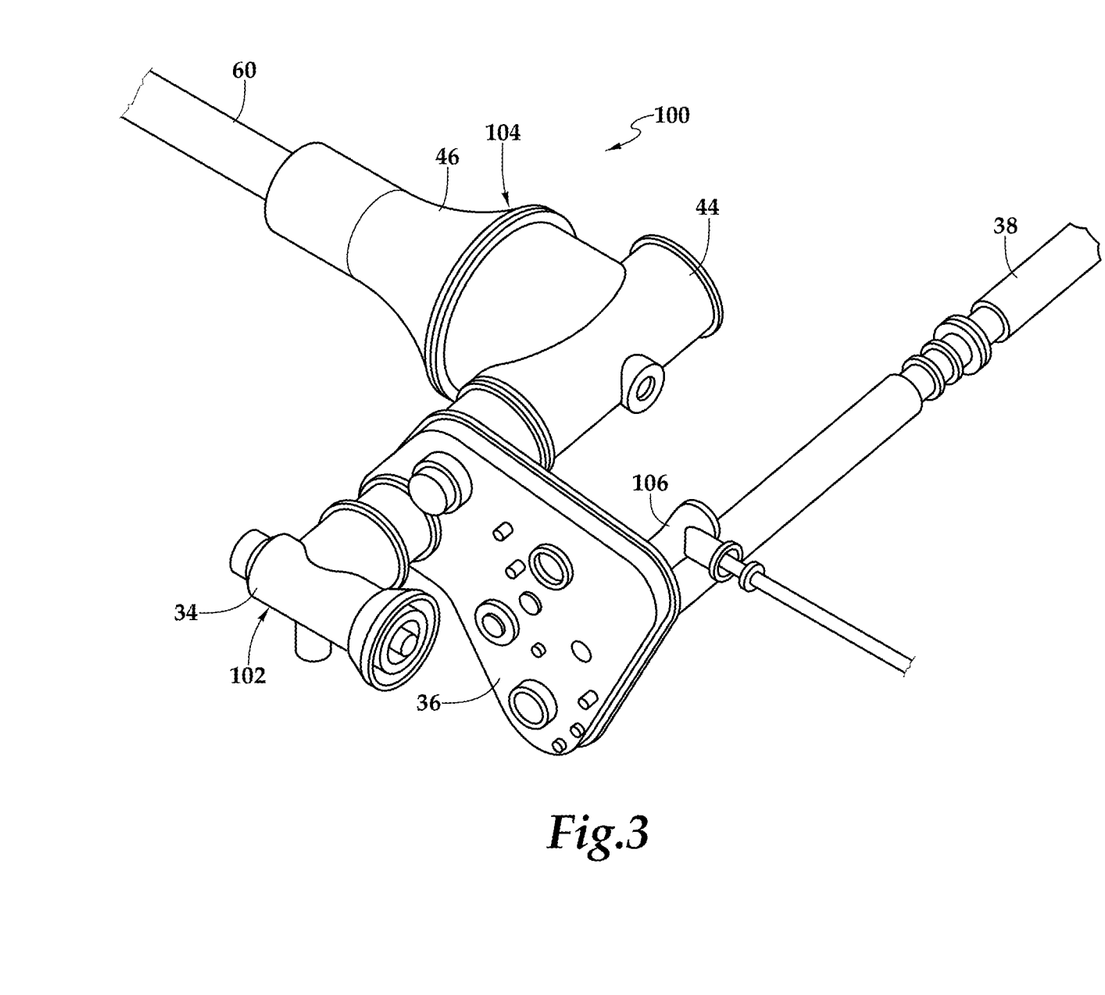
FIG. 3 is a perspective view of a drive system of a tiltrotor aircraft including persistent lubrication systems in accordance with embodiments of the present disclosure.

Referring additionally to FIG. 3 of the drawings, a drive system 100 is depicted, which is representative of the fixed portion of the drive system together with the rotatable portion of the drive system of propulsion assemblies 20a, 20b. As illustrated, drive system 100 include a fixed gearbox assembly 102 and a rotatable gearbox assembly 104. Fixed gearbox assembly 102 includes spiral bevel gearbox 34, interconnect gearbox 36, blower gearbox 106 and interconnect driveshaft 38. Rotatable gearbox assembly 104 includes spindle gearbox 44, proprotor gearbox 46 and mast 60. Engine 32 is coupled to and is in mechanical communication with fixed gearbox assembly 102 which is coupled to and is in mechanical communication with rotatable gearbox assembly 104 which is coupled to and is in mechanical communication with proprotor assembly 26a such that engine 32 provides torque and rotational energy to proprotor assembly 26a via fixed gearbox assembly 102 and rotatable gearbox assembly 104. More specially, engine 32 is fixed relative to wing 18 of aircraft 10 and provides torque via an engine output shaft to spiral bevel gearbox 34. Spiral bevel gearbox 34 changes torque direction by approximately 90 degrees from engine 32 to interconnect gearbox 36. Interconnect gearbox 36 includes gears in a gear train that are coupled to interconnect driveshaft 38, blower gearbox 106 and spindle gearbox 44. Interconnect gearbox 36 may be configured to provide power to various system accessories such as alternators, lube and scavenge pumps, hydraulic pumps, generators and other mechanically driven systems. The blower gearbox 106 may be configured to provide torque to an oil cooler blower fan, which may be used to draw in air for lubricant temperature reduction. Spindle gearbox 44 changes torque direction by approximately 90 degrees from interconnect gearbox 36 to proprotor gearbox 46. Proprotor gearbox 46 is configured to transfer power and reduce engine rotational speed to mast 60.

Gears, bearings and other mechanical components of drive system 100 are subject to wear and heat generation due to contact with other components. These mechanical components may be lubricated to reduce friction and transfer heat away from the components. Lubrication is the process or technique employed to reduce wear of one or both surfaces in close proximity, and moving relative to each other, by interposing a substance, such as a lubricant, between the surfaces to help carry the load between the opposing surfaces. Examples of lubricants can include oil, biolubricants derived from plants and animals, synthetic oils, solid lubricants and aqueous lubricants. Drive system 100 includes multiple lubrication systems to provide lubricant to the mechanical components therein.

Figure 4:
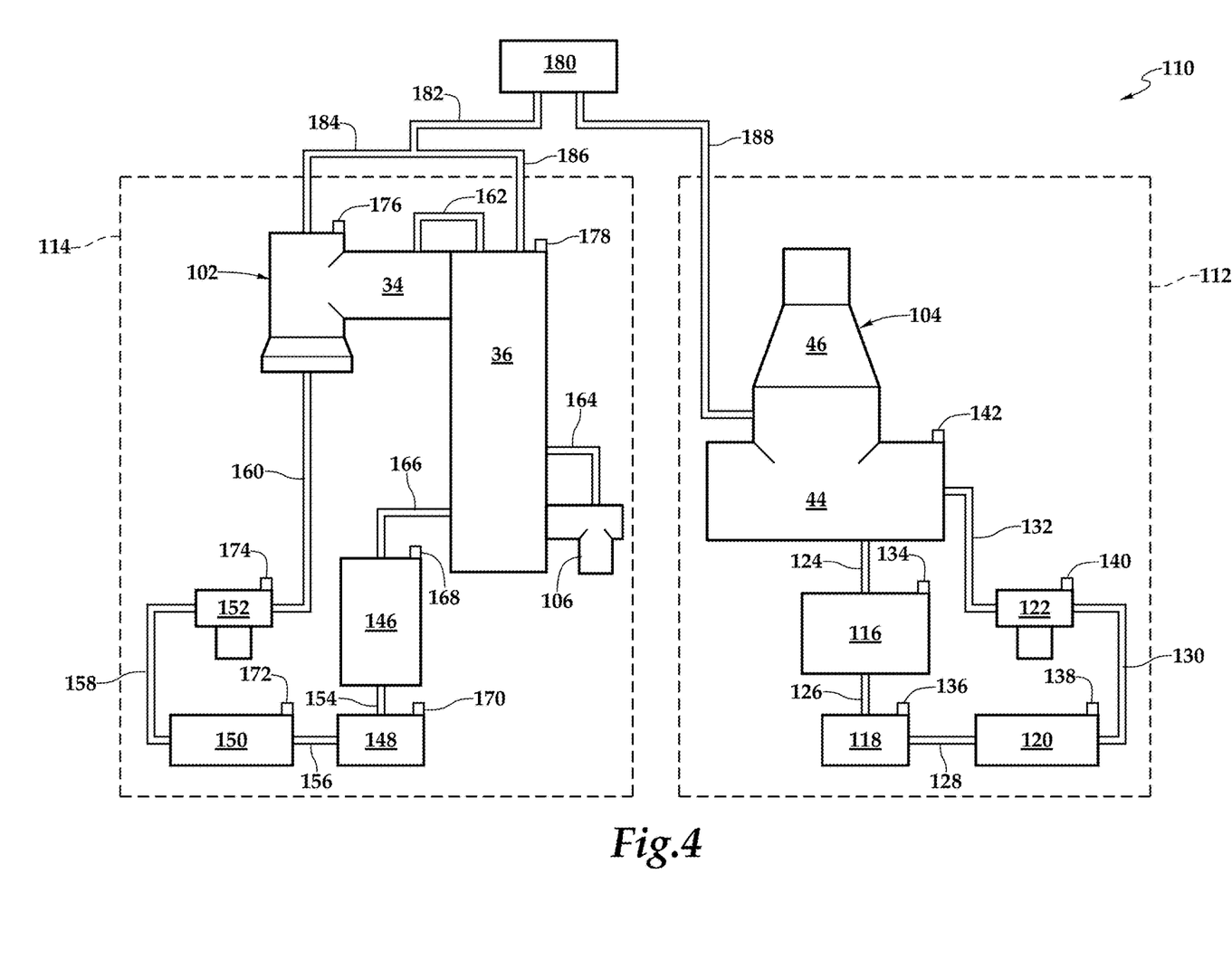
FIG. 4 is a schematic illustration of a lubrication arrangement for a drive system of a tiltrotor aircraft in accordance with embodiments of the present disclosure.

Referring to FIG. 4 of the drawings, a schematic illustration of a lubrication arrangement 110 for drive system 100 is depicted. In the illustrated embodiment, lubrication arrangement 110 includes a first lubrication system 112 and a second lubrication system 114. Lubrication system 112 provides lubricant to components of rotatable gearbox assembly 104 and lubrication system 114 provides lubricant to components of fixed gearbox assembly 102. Lubrication system 112 includes a lubricant tank 116, an operating pump 118, a heat exchanger 120, a filter 122, lubrication lines 124, 126, 128, 130, 132 and sensors 134, 136, 138, 140, 142. Lubrication system 114 includes a lubricant tank 146, an operating pump 148, a heat exchanger 150, a filter 152, lubrication lines 154, 156, 158, 160, 162, 164, 166 and sensors 168, 170, 172, 174, 176, 178. Lubrication systems 112, 114 may also include other components such as pressure regulators, flowmeters, check valves and jets, which are not depicted.

Tanks 116, 146 represent reservoirs that store lubricant within lubrication systems 112, 114, respectively. Tanks 116, 146 may be integral with the housing of one of the gearboxes, such as interconnect gearbox 36 or proprotor gearbox 46, or separate from the housings of the gearboxes. Pumps 118, 148 represent devices that can be configured to circulate pressurized lubricant throughout lubrication systems 112, 114, respectively. Heat exchangers 120, 150 represent devices configured to lower the temperature of the lubricant before the lubricant is applied to the various components that generate heat. Filters 122, 152 represent devices configured to remove contaminants from the lubricant. Sensors 134-142 and 168-178 represent devices that are configured to detect a variety of aircraft parameters and to provide this sensor data to flight control computer 30 such that flight control computer 30 may instruct aircraft systems to respond as appropriate to the detected aircraft parameters. For example, lubrication arrangement 110 may include pressure sensors, temperature sensors, flow rate sensors, volume sensors or other suitable sensors for detecting one or more parameters of the lubricant within lubrication systems 112, 114. Examples of sensors may include strain-gauge sensors, capacitive sensors, electromagnetic sensors, piezoelectric sensors, optical sensors, potentiometric sensors, resonant sensors and thermal sensors, to name a few. The sensor data is preferably communicated to flight control computer 30 to be evaluated such that flight control computer 30 may make a determination regarding the status of systems within lubrication arrangement 110 and command any corrective action as required. Jets, which are not shown in the schematic view of FIG. 4, may be devices configured to dispense lubricant on components of drive system 100 that are subject to friction and/or generate heat, such as gears and bearing.

Lubrication lines 124-132 and 154-166 may represent fluid lines that connect various components of lubrication systems 112, 114. Lubrication lines 124-132 and 154-166 may represent rigid pipelines, such as core passages in the housing of a gearbox, or flexible hoses, such as fluoropolymer tubing. The type of lubrication lines used may depend on the location of the line or expected fluid pressure within the line. Lubrication lines 124-132 and 154-166 may include other components such as swivels and quick disconnect couplings. In some examples, lubrication lines 124-132 and 154-166 may be collapsible in order to reduce residual lubricant during storage and when lubricant is not being flowed through the line.

In the illustrated embodiment of lubrication system 112, tank 116 contains lubricant that is received by pump 118 through lubrication line 126. Pump 118 then delivers lubricant into lubrication line 128 to heat exchanger 120 where the lubricant is cooled. Next, the lubricant may travel from heat exchanger 120, through line 130, to filter 122 where particles may be removed from the lubricant. From filter 122, the lubricant may travel through line 132 to rotatable gearbox assembly 104, such that the lubricant gets delivered to moving components therein. The lubricant then travels through line 124 back to tank 116. In the illustrated embodiment of lubrication system 114, tank 146 contains lubricant that is received by pump 148 through lubrication line 154. Pump 148 then delivers lubricant into lubrication line 156 to heat exchanger 150 where the lubricant is cooled. Next, the lubricant may travel from heat exchanger 150, through line 158, to filter 152 where particles may be removed from the lubricant. From filter 152, the lubricant may travel through line 160 to fixed gearbox assembly 102, such that the lubricant gets delivered to moving components therein. As illustrated, within fixed gearbox assembly 102, the lubricant may travel through lubrication lines 162, 164. The lubricant then travels through line 166 back to tank 146.

Under normal operating conditions, lubrication systems 112, 114 provide proper lubrication to the moving components of rotatable gearbox assembly 104 and fixed gearbox assembly 102, respectively. In one example, the lubricant pressure within the gearboxes of rotatable gearbox assembly 104 and fixed gearbox assembly 102 may be at a normal level of 50 PSI (pounds per square inch). Additionally, during normal operating conditions, first lubrication system 112 is not in fluid communication with second lubrication system 114.

If proper lubrication is not provided to the moving components within the gearbox assemblies due to a loss of lubrication event occurring within one of the lubrication systems, the moving components of the affected gearbox assembly may experience excessive wear or the failure of components. One example cause of a loss of lubrication may be a leak between the casing of one of the gearboxes and one of its components. In some loss of lubrication circumstances, the lubricant pressure within a gearbox may be reduced to an undesired level such as below 30 PSI, and in some instances may even drop to zero PSI.

It is noted that certain aircraft are required to maintain manageable flight operations for selected durations of time if the aircraft experiences low lubricant pressure, such as during a loss of lubrication situation or lubrication system failure. For example, an aviation agency may require that the loss of lubrication will not prevent continued safe operation for at least 30 minutes after perception by the flight crew of the lubrication system failure or loss of lubrication. Therefore, some aircraft may also include a secondary lubrication system, such as emergency lubrication system 180 that may represent a system that has a secondary lubricant tank and a pressurizing device. For example, the lubricant tank of emergency lubrication system 180 may represent a reservoir configured to contain lubricant such as a lubricant tank configured to contain approximately seven gallons of lubricant. Examples of a pressurizing device that can be used in emergency lubrication system 180 may be a mechanically driven pump, a hydraulically driven pump, an electrically driven pump, or a gravity feed system.

In a loss of lubrication event, lubricant may be introduced from the emergency lubrication system 180 to the working components of gearbox assemblies 102, 104. Lubricant may be provided from the secondary lubrication tank of emergency lubrication system 180 to gearbox assembly 102 through lubrication lines 182, 184, 186 and emergency line jets (not shown), and/or to gearbox assembly 104 through lubrication line 188 and emergency line jets (not shown). Even though the use of emergency lubrication system 180 has some advantages, such as increasing the amount of time the aircraft is operable, this method may have some potential disadvantages, such as increasing the weight of the aircraft due to the extra tank with emergency lubricant, the extra pump, the extra valves and/or the added lubricant heating system that may be included in an emergency lubrication system. Therefore, a new system and method for providing emergency lubrication is needed.

Figure 5:
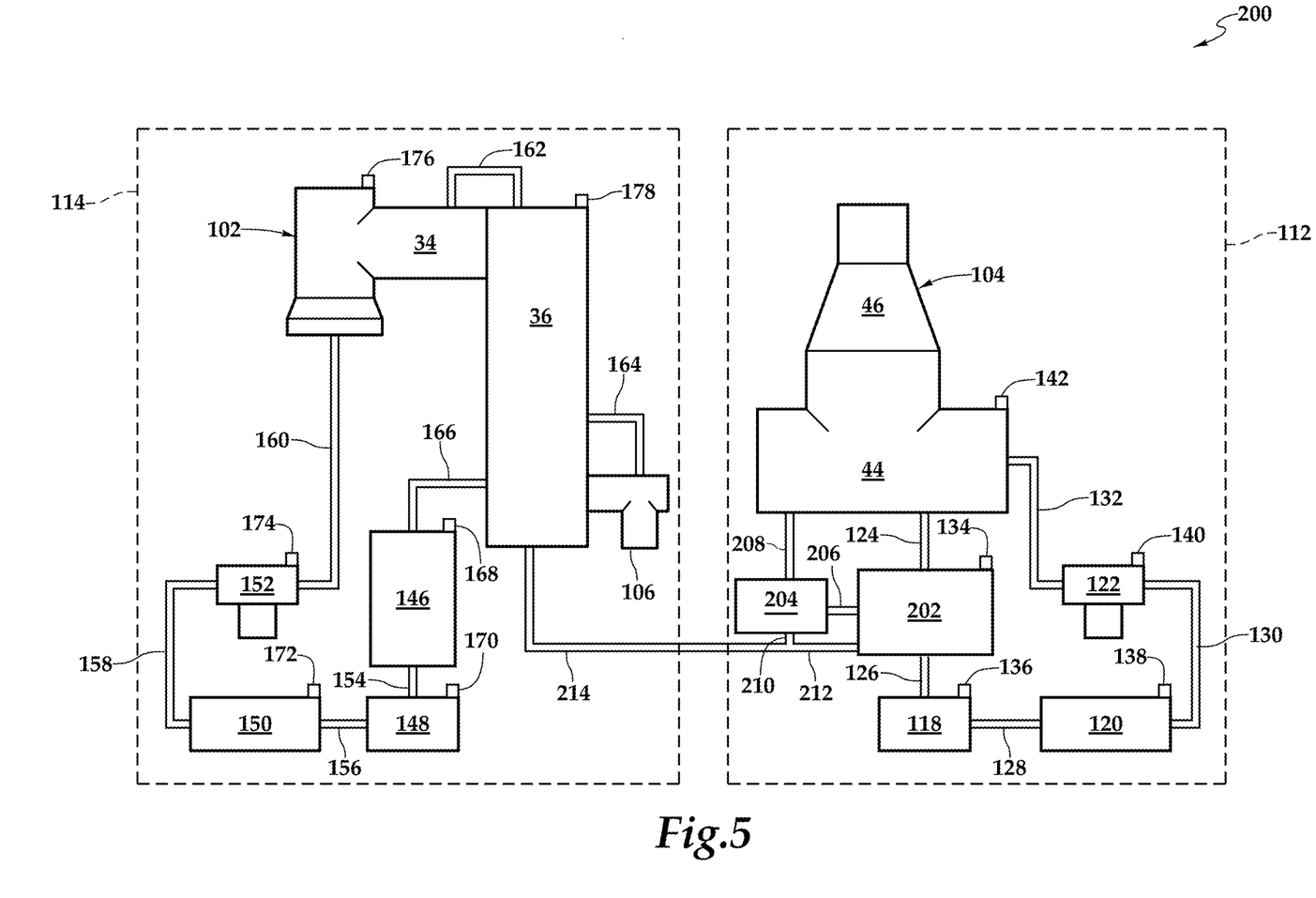
FIG. 5 is a schematic illustration of a lubrication arrangement for a drive system of a tiltrotor aircraft including persistent lubrication systems in accordance with embodiments of the present disclosure.

Referring to FIG. 5 of the drawings, a schematic illustration of a lubrication arrangement 200 for drive system 100 is depicted. As with lubrication arrangement 110, lubrication arrangement 200 includes first lubrication system 112 and second lubrication system 114. Lubrication system 112 provides lubricant to components of rotatable gearbox assembly 104 and lubrication system 114 provides lubricant to components of fixed gearbox assembly 102. Lubrication system 112 includes a bifurcated lubricant tank 202, operating pump 118, heat exchanger 120, filter 122, lubrication lines 124, 126, 128, 130, 132 and sensors 134, 136, 138, 140, 142. Lubrication system 114 includes lubricant tank 146, operating pump 148, heat exchanger 150, filter 152, lubrication lines 154, 156, 158, 160, 162, 164, 166 and sensors 168, 170, 172, 174, 176, 178. Replacing the need for the separate emergency lubrication system 180 discussed with reference to FIG. 4, lubrication arrangement 200 instead utilizes a single emergency pump 204 together with emergency lubrication lines 206, 208, 210, 212, 214 to deliver lubricant from tank 202 to emergency jets (not shown) within gearbox assemblies 102, 104. Emergency lubrication lines 206, 208, 210, 212, 214 may represent rigid pipelines, such as core passages in the housing of a gearbox, or flexible hoses, such as fluoropolymer tubing. The type of lubrication lines used may depend on the location of the line or expected fluid pressure within the line. Lubrication lines 206, 208, 210, 212, 214 may include other components such as swivels and quick disconnect couplings.

Emergency pump 204 represents a device that is configured to deliver on demand pressurized lubricant within lubrication arrangement 200 to one or more desire locations to enable persistent lubrication to components within gearbox assembly 102 in the event of a loss of lubrication relating to gearbox assembly 102 or persistent lubrication to components within gearbox assembly 104 in the event of a loss of lubrication relating to gearbox assembly 104. As used herein, the term "persistent" refers to a predetermined time period required to maintain manageable flight operations during a lubrication system failure or loss of lubrication event such as for at least 30 minutes after perception by the flight crew of the lubrication system failure or loss of lubrication event.

Emergency pump 204 is preferably an electrically driven pump that is operated responsive to pilot initiated or sensor data initiated commands from flight control computer 30 relating to a lubrication system failure or loss of lubrication event in either gearbox assembly 102 or gearbox assembly 104. Emergency pump 204 preferably includes a solenoid type valve that is used to direct the lubricant to the gearbox assembly experiencing the loss of lubrication. An electric current may control the solenoid valve to switch the valve between a closed position, an open position delivering lubricant to gearbox assembly 102 or an open position delivering lubricant to gearbox assembly 104. Importantly, lubrication arrangement 200 does not include an extra lubrication tank containing emergency lubricant, dedicated valves or a dedicated heating system to maintain the emergency lubricant at a suitable temperature. Instead, tank 202 is designed and sized to include an amount of extra lubricant sufficient for persistent lubrication of gearbox assembly 102 and/or gearbox assembly 104, such as an extra three to four gallons of lubricant. More specifically, upon determining the lubricant flow rate that is critical to sustain operation of gearbox assemblies 102, 104 during respective loss of lubrication events, lubrication arrangement 200 can be designed such that tank 202 and emergency pump 204 are suitably sized to provide persistent flow rates and volumes such that sustained operation of the affected gearbox may be provided for a predetermined time period such as 30 minutes.

As discussed herein, under normal operating conditions lubrication system 112 provides lubricant to components of rotatable gearbox assembly 104 and lubrication system 114 provides lubricant to components of fixed gearbox assembly 102. As such, under normal operating conditions, these two lubrication systems 112, 114 operate independent of one another. Responsive to a loss of lubrication in lubrication system 112, lubricant can be supplied to gearbox assembly 104 from tank 202 by operating emergency pump 204 to direct lubricant to the emergency jets of gearbox assembly 104 via lubrication lines 206, 208. The emergency jets may allow for a slower flow rate of lubricant than the normal operating jets in order to conserve lubricant. Similarly, responsive to a loss of lubrication in lubrication system 114, lubricant can be supplied to gearbox assembly 102 from tank 202 by operating emergency pump 204 to direct lubricant to the emergency jets of gearbox assembly 102 via lubrication lines 206, 210, 214. Again, the emergency jets may allow for a slower flow rate of lubricant than the normal operating jets in order to conserve lubricant. In addition, as explained herein, during a loss of lubrication in lubrication system 114, emergency pump 204 also directs lubricant back into tank 202 via lubrication lines 206, 210, 212 which sustains the lubricant volume for gearbox assembly 104 as lubrication system 112 continuing to operate normally.

Figure 6A:
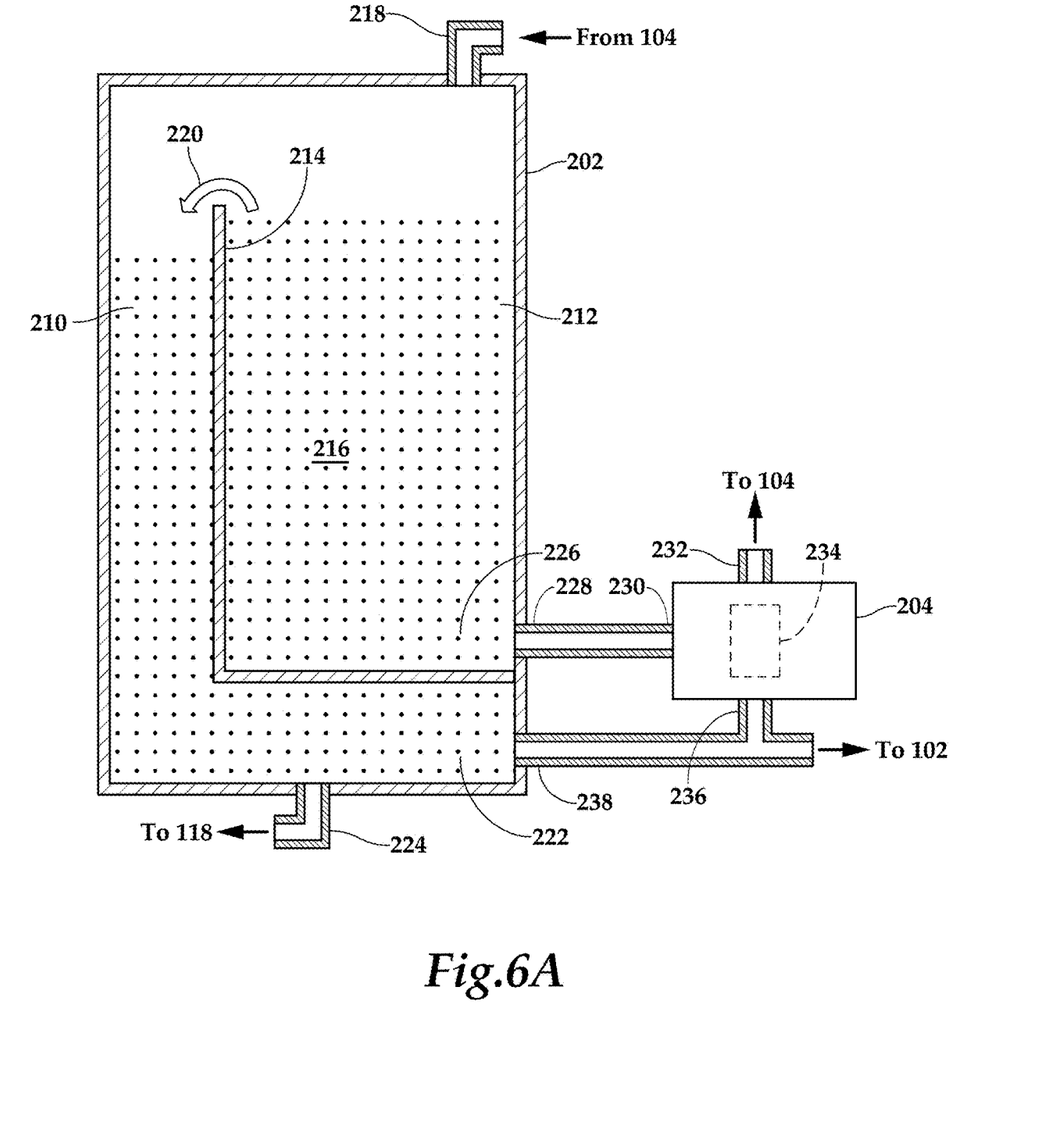
FIGS. 6A-6C are cross sectional views of a lubrication tank and emergency pump of a lubrication arrangement for a drive system of a tiltrotor aircraft including persistent lubrication systems in various operating modes in accordance with embodiments of the present disclosure.
Figure 6B:
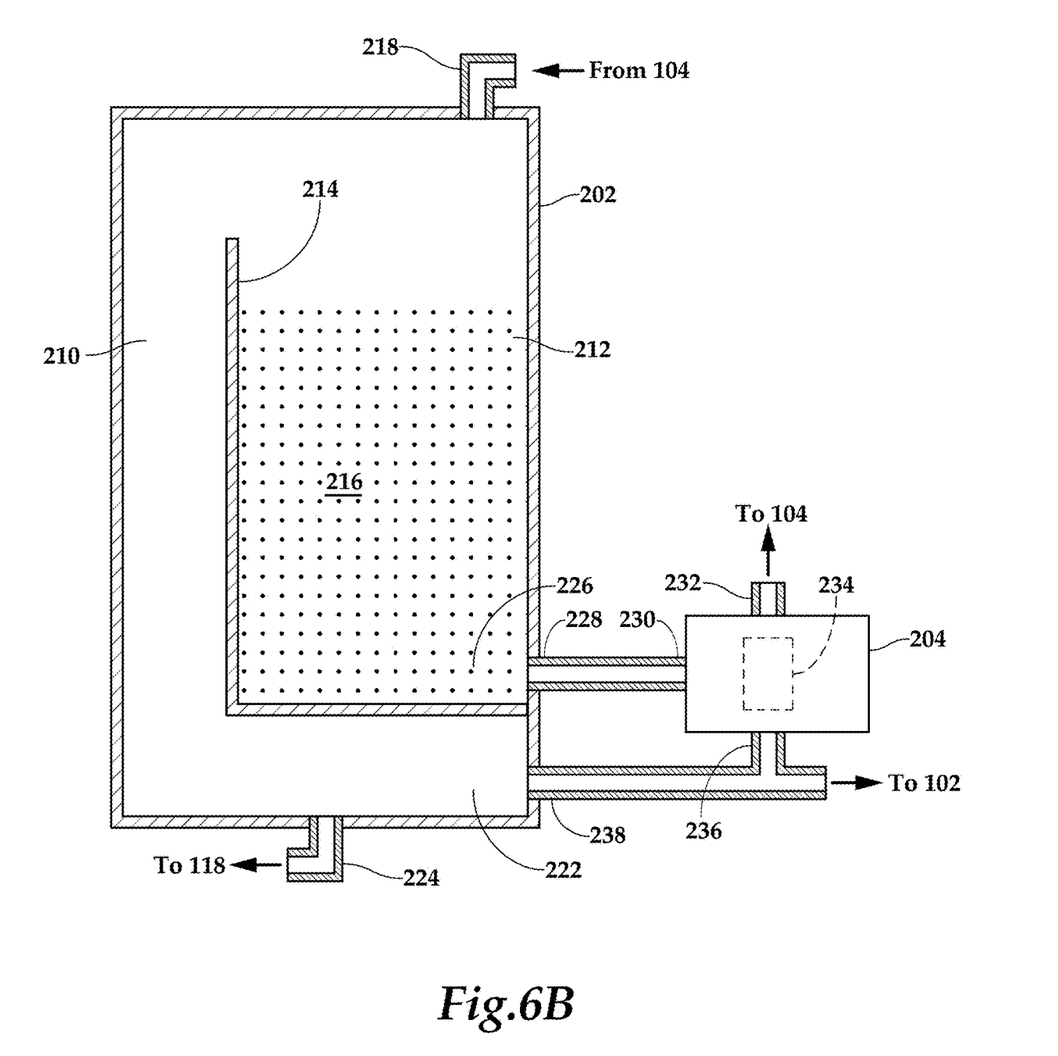
Figure 6C:
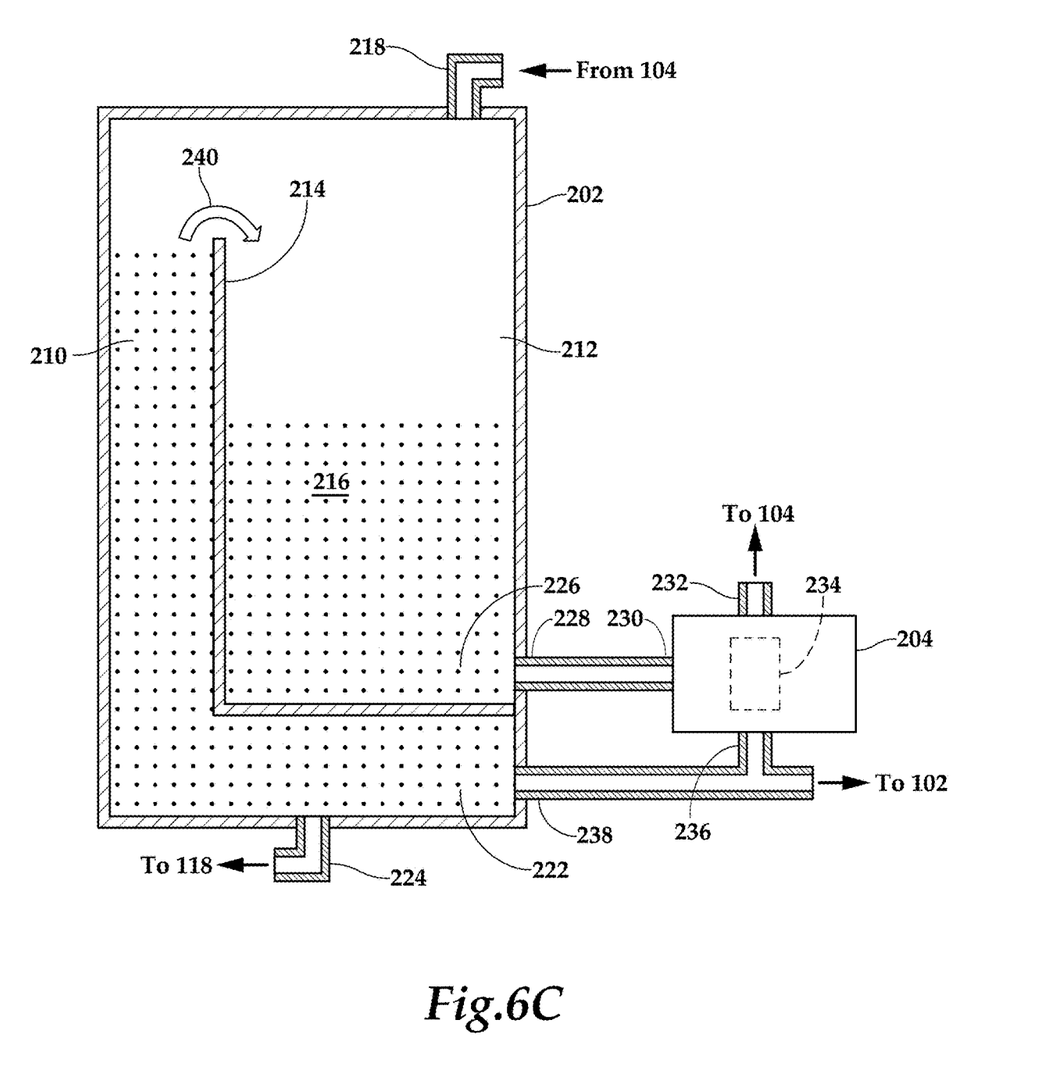

Referring additionally to FIG. 6A-6C of the drawings, the operations of tank 202 and emergency pump 204 will be discussed in greater detail. In the illustrated embodiment, tank 202 is a bifurcated tank having an operating chamber 210 and an emergency chamber 212 that are separated by a dam 214 such that emergency chamber 212 is positioned above a first portion of operating chamber 210 and beside a second portion of operating chamber 210 within tank 202. During normal operating conditions of lubrication systems 112, 114, as best seen in FIG. 6A, tank 202 receives a continuous volume of lubricant 216, such as 16.9 gallons per minute, from gearbox assembly 104 at inlet 218. As inlet 218 is disposed above emergency chamber 212, lubricant 216 from inlet 218 enters emergency chamber 212. The lubricant 216 entering emergency chamber 212 causes a continuous volume of lubricant 216, such as 16.9 gallons per minute, to spill over dam 214 into operating chamber 210, as indicated by arrow 220. A continuous volume of lubricant 216, such as 16.9 gallons per minute, is then circulated through lubrication system 112 by pump 118 from a lower sump 222 of operating chamber 210 through an operating outlet 224. In this manner, lubrication is provided to gearbox assembly 104 during normal operating conditions of lubrication systems 112, 114. It is noted that having bifurcated tank 202 with dam 214 between operating chamber 210 and emergency chamber 212 and the extra emergency lubricant 216 within lubrication system 112, as discussed herein, provide an added benefit of extending the dwell time of lubricant 216 within tank 202 enabling improved lubricant/air separation prior to recirculation of lubricant 216 within lubrication system 112.

In FIG. 6B, a failure or loss of lubrication in lubrication system 112 is indicated by the lack of lubricant 216 in operating chamber 210. This loss of lubrication in lubrication system 112 may be detected by one or more of sensors 134, 136, 138, 140, 142 as a pressure parameter, a temperature parameter, a flow rate parameter, a volume parameter or other lubrication related parameter that is outside of a desired threshold. The sensor data may be used to warn a pilot of aircraft 10 via an audible or visual indicator and/or may be sent directly to flight control computer 30. In either case, one or more electrical signals may be sent to emergency pump 204 by flight control computer 30 to command operation of emergency pump 204. In the illustrated embodiment, emergency pump 204 draws lubricant 216 from an upper sump 226 of emergency chamber 212 through an emergency outlet 228 into a suction port 230. Lubricant 216 is then directed to discharge port 232 of emergency pump 204 by a valve 234, such as a solenoid valve that operates responsive to one of the electrical signals from flight control computer 30 to place suction port 230 in fluid communication with discharge port 232. Discharge port 232 is also in fluid communication with the emergency jets within gearbox assembly 104 such that lubricant 216 can be supplied to components within gearbox assembly 104. In this manner, a continuous volume of lubricant 216, such as 0.11 gallons per minute, is delivered from emergency chamber 212 by emergency pump 204 to gearbox assembly 104 to provide persistent lubrication to components therein for a predetermined period of time such as at least 30 minutes. In the illustrated embodiment, the emergency jets allow for a slower flow rate of lubricant (0.11 gallons per minute) than the normal operating jets (16.9 gallons per minute) which conserves lubricant 216. It is noted that the reduced volume of lubricant within emergency chamber 212 depicted in FIG. 6B represents the volume of lubricant 216 that has been withdrawn from lubrication system 112 to provide persistent lubrication to gearbox assembly 104 during the failure or loss of lubrication in lubrication system 112. As lubrication system 114 operates independently from lubrication system 112, lubrication system 114 is not affected by the loss of lubrication in lubrication system 112 or the operations of emergency pump 204.

FIG. 6C depicts a failure or loss of lubrication in lubrication system 114. A loss of lubrication in lubrication system 114 may be detected by one or more of sensors 168, 170, 172, 174, 176, 178 as a pressure parameter, a temperature parameter, a flow rate parameter, a volume parameter or other lubrication related parameter that is outside of a desired threshold. The sensor data may be used to warn a pilot of aircraft 10 via an audible or visual indicator and/or may be sent directly to flight control computer 30. In either case, one or more electrical signals may be sent to emergency pump 204 by flight control computer 30 to command operation of emergency pump 204. In the illustrated embodiment, emergency pump 204 draws lubricant 216 from upper sump 226 of emergency chamber 212 through emergency outlet 228 into suction port 230. Lubricant 216 is then directed to discharge port 236 of emergency pump 204 by valve 234 responsive to one of the electrical signals from flight control computer 30 to place suction port 230 in fluid communication with discharge port 236. Discharge port 236 is also in fluid communication with the emergency jets within gearbox assembly 102 such that lubricant 216 can be supplied to components within gearbox assembly 102. In this manner, a continuous volume of lubricant 216, such as 0.2 gallons per minute, is delivered from emergency chamber 212 by emergency pump 204 to gearbox assembly 102 to provide persistent lubrication to components therein for a predetermined period of time such as at least 30 minutes.

In addition, in order to maintain normal lubrication to gearbox assembly 104 during a failure or loss of lubrication in lubrication system 114, emergency pump 204 recirculates lubricant 216 from upper sump 226 of emergency chamber 212 to lower sump 222 of operating chamber 210. This is beneficial in tank designs in which emergency chamber 212 is larger than operating chamber 210. Continuing with the above example wherein 16.9 gallons per minute circulates through lubrication system 112, emergency pump 204 may be used to continuously recirculates a volume of lubricant 216 from upper sump 226 of emergency chamber 212 to lower sump 222 of operating chamber 210 in excess of 16.9 gallons per minute to assure that operating chamber 210 contains sufficient lubricant 216 such that a continuous volume of 16.9 gallons per minute of lubricant 216 can be circulated through lubrication system 112 by pump 118 from lower sump 222 of operating chamber 210 through operating outlet 224. In one example, emergency pump 204 may draw a continuous volume of 18.2 gallons per minute of lubricant 216 from upper sump 226 of emergency chamber 212 through emergency outlet 228 into suction port 230. Lubricant 216 is then directed to discharge port 236 of emergency pump 204 by valve 234. From discharge port 236, the continuous volume of 18.2 gallons per minute is split such that a continuous volume of gallons per minute of lubricant 216 is delivered to the components of gearbox assembly 102 via the emergency jets therein and a continuous volume of 18.0 gallons per minute of lubricant 216 is delivered to lower sump 222 of operating chamber 210 through inlet 238. As only a continuous volume of 16.9 gallons per minute of lubricant 216 is circulated through lubrication system 112, the excess continuous volume of 1.1 gallons per minute of lubricant 216 fills operating chamber 210 and spills over into emergency chamber 212 as indicated by arrow 240. It is noted that the reduced volume of lubricant within emergency chamber 212 depicted in FIG. 6C represents the volume of lubricant 216 that has been withdrawn from lubrication system 112 to provide persistent lubrication to gearbox assembly 102 during the failure or loss of lubrication in lubrication system 114. In this manner, persistent lubrication to components of gearbox assembly 102 is provided for a predetermined period of time, such as at least 30 minutes, together with substantially normal lubrication continuing for gearbox assembly 104.

The present embodiments, provide an improved lubrication system having persistent lubrication for multiple aircraft gearbox assemblies following a failure or loss of lubrication in any one of the aircraft gearbox assemblies. The improved lubrication system disclosed in the present embodiments utilizes a single tank that not only contains operating lubricant for one of the gearbox assemblies but also the total volume of emergency lubricant for multiple aircraft gearbox assemblies. Combining the total volume of emergency lubricant with operating lubricant in the same tank provides significant weight savings compared to prior emergency lubrication systems. In addition, the combined volume increases the dwell time of lubricant within the tank under normal operation conditions. The improved lubrication system disclosed in the present embodiments also reduces the potential leak paths compared to prior emergency lubrication systems by reducing the complexity and number of components, lubrications lines and connections therebetween.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A drive system for an aircraft, the drive system comprising:
    a first gearbox assembly;
    a second gearbox assembly in mechanical communication with the first gearbox assembly;
    a first lubrication system associated with the first gearbox assembly, the first lubrication system including a bifurcated first tank configured to contain a lubricant in an operating chamber including a lower sump and in an emergency chamber including an upper sump, the first lubrication system including a first operating pump configured to supply the lubricant from the operating chamber to the first gearbox assembly;
    a second lubrication system associated with the second gearbox assembly, the second lubrication system including a second tank configured to contain the lubricant and a second operating pump configured to supply the lubricant from the second tank to the second gearbox assembly; and
    an emergency pump in fluid communication with the emergency chamber;
    wherein, the emergency pump is configured to supply the lubricant to the first gearbox assembly from the emergency chamber responsive to a failure in the first lubrication system; and
    wherein, the emergency pump is configured to supply the lubricant to the second gearbox assembly and to the operating chamber from the emergency chamber responsive to a failure in the second lubrication system.

2. The drive system as recited in claim 1 wherein the bifurcated first tank includes a dam between the emergency chamber and the operating chamber.

3. The drive system as recited in claim 2 wherein, during normal operating conditions of the first and second lubrication systems, the operating chamber is configured to receive the lubricant from the emergency chamber that spills over the dam.

4. The drive system as recited in claim 2 wherein, responsive to the failure in the second lubrication system, the emergency chamber is configured to receive the lubricant from the operating chamber that spills over the dam.

5. The drive system as recited in claim 1 wherein the emergency chamber is above a first portion of the operating chamber and beside a second portion of the operating chamber.

6. The drive system as recited in claim 1 wherein the bifurcated first tank includes an inlet that is disposed above the emergency chamber such that the lubricant entering the bifurcated first tank from the inlet flows into the emergency chamber.

7. The drive system as recited in claim 1 wherein the bifurcated first tank includes an operating outlet disposed below the lower sump such that the lubricant from the operating chamber exits the bifurcated first tank through the operating outlet during normal operating conditions of the first lubrication system.

8. The drive system as recited in claim 1 wherein the emergency pump is configured to supply the lubricant to the first gearbox assembly from the emergency chamber responsive to the failure in the first lubrication system for a predetermined period of time.

9. The drive system as recited in claim 1 wherein the emergency pump is configured to supply the lubricant to the second gearbox assembly from the emergency chamber responsive to the failure in the second lubrication system for a predetermined period of time.

10. The drive system as recited in claim 1 wherein the emergency pump is an electrically operated pump.

11. The drive system as recited in claim 1 wherein the emergency pump further comprises a valve, a suction port, a first discharge port and a second discharge port, the valve shiftable between first and second positions;
wherein, in the first position, the suction port is in fluid communication with the first discharge port and out of fluid communication with the second discharge port such that the emergency pump is configured to supply the lubricant to the first gearbox assembly from the emergency chamber responsive to the failure in the first lubrication system; and
wherein, in the second position, the suction port is in fluid communication with the second discharge port and out of fluid communication with the first discharge port such that the emergency pump is configured to supply the lubricant to the second gearbox assembly and to the operating chamber from the emergency chamber responsive to the failure in the second lubrication system.

12. The drive system as recited in claim 11 wherein the valve is a solenoid valve.

13. The drive system as recited in claim 1 wherein, responsive to the failure in the second lubrication system, the emergency pump supplies the lubricant to the second gearbox assembly at a first flow rate and to the operating chamber at a second flow rate that is greater than the first flow rate.

14. The drive system as recited in claim 1 wherein the first and second lubrication systems are pressurized lubrication systems.

15. The drive system as recited in claim 1 wherein the first lubrication system further comprises a heat exchanger, a filter and at least one lubrication line.

16. The drive system as recited in claim 1 wherein the second lubrication system further comprises a heat exchanger, a filter and at least one lubrication line.

17. A tiltrotor aircraft having a helicopter mode and an airplane mode, the tiltrotor aircraft comprising:
a proprotor assembly;
a first gearbox assembly in mechanical communication with the proprotor assembly;
a second gearbox assembly in mechanical communication with the first gearbox assembly;
an engine in mechanical communication with the second gearbox assembly and configured to provide torque and rotational energy to the proprotor assembly via the first and second gearbox assemblies;
a first lubrication system associated with the first gearbox assembly, the first lubrication system including a bifurcated first tank configured to contain a lubricant in an operating chamber including a lower sump and in an emergency chamber including an upper sump, the first lubrication system including a first operating pump configured to supply the lubricant from the operating chamber to the first gearbox assembly;
a second lubrication system associated with the second gearbox assembly, the second lubrication system including a second tank configured to contain the lubricant and a second operating pump configured to supply the lubricant from the second tank to the second gearbox assembly; and
an emergency pump in fluid communication with the emergency chamber;
wherein, the emergency pump is configured to supply the lubricant to the first gearbox assembly from the emergency chamber responsive to a failure in the first lubrication system; and
wherein, the emergency pump is configured to supply the lubricant to the second gearbox assembly and to the operating chamber from the emergency chamber responsive to a failure in the second lubrication system.

18. The tiltrotor aircraft as recited in claim 17 wherein the first gearbox assembly further comprises a proprotor gearbox.

19. The tiltrotor aircraft as recited in claim 17 wherein the second gearbox assembly further comprises an interconnect gearbox.

20. An aircraft comprising:
a rotor assembly;
a first gearbox assembly in mechanical communication with the rotor assembly;
a second gearbox assembly in mechanical communication with the first gearbox assembly;
an engine in mechanical communication with the second gearbox assembly and configured to provide torque and rotational energy to the rotor assembly via the first and second gearbox assemblies;
a first lubrication system associated with the first gearbox assembly, the first lubrication system including a bifurcated first tank configured to contain a lubricant in an operating chamber including a lower sump and in an emergency chamber including an upper sump, the first lubrication system including a first operating pump configured to supply the lubricant from the operating chamber to the first gearbox assembly;

a second lubrication system associated with the second gearbox assembly, the second lubrication system including a second tank configured to contain the lubricant and a second operating pump configured to supply the lubricant from the second tank to the second gearbox assembly; and an emergency pump in fluid communication with the emergency chamber;

wherein, the emergency pump is configured to supply the lubricant to the first gearbox assembly from the emergency chamber responsive to a failure in the first lubrication system; and wherein, the emergency pump is configured to supply the lubricant to the second gearbox assembly and to the operating chamber from the emergency chamber responsive to a failure in the second lubrication system.

* * * * *